United States Patent [19]

McGlothlin et al.

[11] 3,878,111

[45] Apr. 15, 1975

[54] DRILLING FLUIDS, ADDITIVES THEREFOR, AND STABILIZATION METHODS THEREFOR

[75] Inventors: Raymond E. McGlothlin; Tom E. Cox, both of Houston, Tex.

[73] Assignee: Dresser Industries, Inc., Dallas, Tex.

[22] Filed: Aug. 3, 1973

[21] Appl. No.: 385,355

Related U.S. Application Data

[63] Continuation-in-part of Ser. No. 862,516, Sept. 30, 1969, abandoned.

[52] U.S. Cl............................. 252/8.5 M; 252/8.5 P
[51] Int. Cl............................................. C10m 1/54
[58] Field of Search...... 260/414, 429.5; 252/8.5 M, 252/8.5 P, 351, 353, 356

[56] References Cited
UNITED STATES PATENTS

| | | | |
|---|---|---|---|
| 2,621,194 | 12/1952 | Balthis | 252/389 X |
| 2,643,262 | 6/1953 | Bostwick | 260/429.5 |
| 3,099,624 | 7/1963 | Wilson | 252/8.5 |
| 3,642,623 | 2/1972 | Bennett et al. | 252/8.5 |

OTHER PUBLICATIONS

Kirk–Othmer, Encyclopedia of Chemical Technology, Vol. 20, 1969, pp. 464–470.

"Tyzor" Organic Titanates, pamphlet by E. I. Dupont de Nemours and Co., Wilmington, Del., Pub. 4–1966, pp. 13–19.

Primary Examiner—Herbert S. Guynn
Attorney, Agent, or Firm—Raymond T. Majesko

[57] ABSTRACT

A drilling fluid additive employing at least one emulsifier and at least one titanate. Drilling fluids containing the above additive. A method of stabilizing a drilling fluid by employing the above additive.

8 Claims, No Drawings

DRILLING FLUIDS, ADDITIVES THEREFOR, AND STABILIZATION METHODS THEREFOR

This application is a continuation-in-part of application Ser. No. 862,516, filed Sept. 30, 1969, now abandoned.

BACKGROUND OF THE INVENTION

The premise that an organic liquid such as oil is better, at least in certain situations, than water-base materials for drilling fluids is a matter of long standing in the petroleum industry. As an outgrowth of this premise, what is termed in the petroleum industry as "oil-base" drilling emulsions and "invert" drilling emulsions have been developed.

"Oil-base" drilling emulsions are those which contain a large amount, e.g., at least about 90 volume per cent (preferably 90 to 99 volume per cent) based on the total volume of the liquid in the emulsion, of an organic material as the external phase of the emulsion. The remainder of the emulsion is a minor amount of an aqueous phase which is the internal phase of the emulsion and normal drilling fluid additives. Thus, "oil-base" emulsions are water-in-oil emulsions. Of course, such emulsions contain weighting agents and other additives which help give the emulsion the desired physical properties for its intended use as a drilling fluid.

The base material for the oil-base or invert emulsion is organic in nature, e.g., substantially all a hydrocarbon material. Examples of such materials include crude oil, Diesel oil, heavy petroleum refinery liquid residues, asphalt in its normal state, asphalt which has been ozidized by bubbling air therethrough to increase the softening point thereof, lampblack, and the like. Thus, this invention applies to any organic base material or materials conventionally used in preparing oil-base drilling emulsions.

Those emulsions which are normally termed "invert" emulsions are a species of water-in-oil emulsions which employs organic materials similar to those employed in oil-base drilling emulsions but which contains smaller amounts of the organic, external phase, e.g., at least about 50 volume per cent (preferably 50 to 90 volume per cent) based on the total volume of the liquid in the emulsion, and larger amounts of the aqueous, internal phase. This invention applies to conventional invert emulsions whatever the organic base may be and, therefore, are also included herein under the general term "organic drilling fluid." It should be understood that these emulsions employ organic base materials which are substantially hydrocarbon materials as explained hereinabove with regard to the oil-base drilling emulsions.

The organic base drilling emulsions, hereinafter referred to as organic base drilling fluids, are subject to contamination by inorganic salts such as alkali metal halides, carbonates, sulfates, etc.; alkaline earth metal halides, carbonates, sulfates, etc.; and the like. During a well drilling operation, the storing of the drilling fluids on the earth's surface, and the like, these salts can enter and contaminate the drilling fluids by themselves or dissolved in water. For example, surface water, subsurface water entering the well borehole, and even water from an aqueous base drilling fluid which is being replaced in the borehole by the organic base drilling fluid can enter the organic base drilling fluid thereby causing contamination of the organic base drilling fluid.

A particularly troublesome inorganic salt in certain geographical areas such as the North Sea, is Carnallite ($KCl \cdot MgCl_2 \cdot 6H_2O$). This salt dissolves very readily in organic base drilling fluids with slight temperature increases and precipitates out of the drilling fluid just as readily with equally as slight temperature decreases. However, when this salt precipitates out of the drilling fluid, it brings water with it which wets the solids in the drilling fluid and causes the solids to settle out of the drilling fluids. Settling out of solids can ruin the rheological properties of the drilling fluid and therefore can ruin the drilling fluid for use as such.

Water wetting of the solids in the drilling fluid also occurs when the organic drilling fluid is contaminated with the above mentioned inorganic salts. Water wetting of the solids normally in the drilling fluids, e.g., clays, barite, or other weighting agents, and the like, whether by inorganic salt contamination or Carnallite precipitation, renders the organic drilling fluid extremely unstable, even to the point of "flipping" the drilling fluid, i.e., causing the drilling fluid to change from the desired water-in-oil state to the undesired oil-in-water state. When the drilling fluid flips the weighting agent and other solids therein readily settle out. Due to this settling the viscosity of the drilling fluid is increased greatly and the emulsion is ruined as a useful drilling fluid.

Heretofore, emulsifiers have been added in an attempt to counteract inorganic salt contamination and thereby stabilize the drilling fluid against such contamination. However, it was found that such large amounts of emulsifiers had to be added to the drilling fluid that the viscosity of the drilling fluid was decreased to an extent that the weighting agents and other solids therein readily settled out even without flipping the drilling fluid.

SUMMARY OF THE INVENTION

It has now been discovered that if a combination of at least one anionic emulsifier and at least one titanate is employed in the drilling fluid, the drilling fluid is substantially stabilized against inorganic salt contamination, particularly Carnallite contamination, and that this stabilization is achieved without reducing the viscosity of the drilling fluid so that solids therein tend to settle out.

Accordingly, this invention relates to an organic base drilling fluid additive composed of at least one anionic emulsifier which is at least partially soluble in the organic base of the drilling fluid and at least one titanate as hereinafter defined.

This invention also relates to an organic base drilling fluid containing an effective inorganic salt stabilizing amount of at least one of the additives of this invention.

This invention also relates to a method for stabilizing an organic base drilling fluid against inorganic salt contamination by employing at least one additive of this invention.

The drilling fluids to which this invention applies are useful in the drilling of all types of wells be they oil, gas, water, combinations thereof, mine shafts, blasting holes, and the like. Therefore, this invention in all its aspects, has wide utility in the earth drilling field.

Accordingly, it is an object of this invention to provide a new and improved organic base drilling fluid additive. It is another object to provide a new and improved additive for stabilizing organic base drilling fluids against salt contamination. It is another object to provide a new and improved additive for stabilizing organic base drilling fluids against Carnallite contamination. It is another object to provide new and improved organic base drilling fluids which are stabilized against inorganic salt, particularly Carnallite, contamination. It is another object to provide a new and improved method for stabilizing organic base drilling fluids against the adverse effects of contamination by inert salt, particularly Carnallite. It is another object to provide a new and improved method for rendering organic base drilling fluids substantially inert to the effects of inorganic salt contamination without unduly thinning the drilling fluid and thereby promoting solids settling from the fluid.

Other aspects, objects, and advantages of the invention will be apparent to those skilled in the art from the disclosure and the appended claims.

DETAILED DESCRIPTION OF THE INVENTION

According to this invention there is provided an organic base drilling fluid additive composed of at least one anionic emulsifier which is at least partially soluble in the organic base of the drilling fluid and at least one titanate.

The emulsifiers useful in this invention vary widely, are well known in the art, and are available commercially. The extremely large number of useful emulsifiers available renders specific chemical delineation of their scope substantially impossible, but it is certain that they should be anionic in nature and at least partially soluble in the organic base of the drilling fluid.

As nonlimiting examples, the emulsifiers can be organic (hydrocarbon) soluble alkyl aryl sulfonic acid, alkyl aryl sulfonate, sulfosuccinate compounds, and mixtures thereof.

Suitable materials within the above group of compounds include those having the formulae (I) 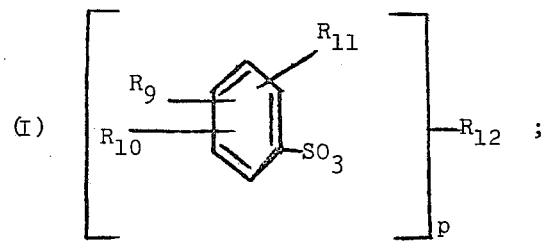

where $p$ is an integer from 1–6, inclusive, $R_9$ and $R_{10}$ are the same or different, alkyl substituents each having from 10–30, inclusive, carbon atoms, $R_{12}$ is one of the following: hydrogen, alkali metal, alkaline earth metal, Al, Pb, Cr, Mn, Fe, Co, Ni, ammonium radical, primary amine·H, secondary amine·H, tertiary amine·H, and $R_{11}$ is one of the following: halogen, OH, $NH_2$, hydrogen; and (II) 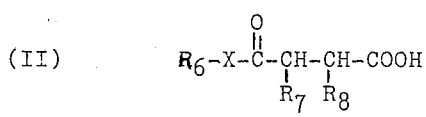

where $R_6$ is a fatty acid residue or fatty alcohol residue, X is an alkylene grouping joined to $R_6$ and to the sulfosuccinate residue via amide (e.g., X is $-O-R_{16}-N-$, where $R_{16}$ is alkyl, cycloalkyl, or aromatic having from 1 to 12 carbon atoms per radical) or ester (e.g., X is $-O-$) linkages, one of $R_7$ and $R_8$ is hydrogen and the other is $-SO_3M$ where M is one of alkali metal and alkaline earth metal.

In this invention the alkali metals are lithium, sodium, potassium, rubidium, cesium, and francium, preferably sodium and potassium; while the alkaline earth metals are beryllium, magnesium, calcium, strontium, barium, and radium, preferably magnesium and calcium.

A particularly suitable emulsifier is the monocyclic emulsifier hereinabove where $p$ is 2, $R_9$ and $R_{10}$ are each dodecyl radicals, $R_{11}$ is hydrogen, and $R_{12}$ is one of the alkali metals and alkaline earth metals.

The above emulsifiers are known in the art and commercially available. For example, U.S. Pat. Nos. 3,099,624 and 3,401,007 fully and completely disclose these emulsifiers. However, these emulsifiers are by no means the limit of the emulsifiers useful in this invention.

Suitable specific emulsifiers include sulfonate of oleic acid sodium salt, sodium lauryl ether sulfate, octylalcohol phosphate ester, isopropylamine salt of $C_{12}$–$C_{15}$, inclusive, alcohol phosphate ester, sodium salt of dimethylnaphthalene sulfonate, tetrasodium N-(1,2 dicarboxyethyl)-N-octadecylsulfosuccinamate, dioctylester of sodium sulfosuccinic acid, linear alkyl $C_{12}$–$C_{15}$, inclusive, benzene sulfonic acid, isopropylamine salt of dodecylbenzene sulfonic acid.

The titanates of this invention are also known in the art and available commercially. Suitable titanates are those compounds of the formulae III. $Ti(OR)_4$ where R is one of alkyl (linear or branched), cycloalkyl (including branched), and aryl (including branched),

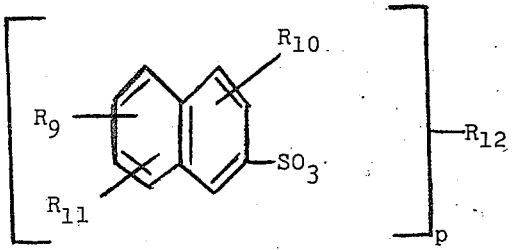

preferably alkyl (linear or branched), having from 1 to 22, preferably 1 to 18, carbon atoms per molecule, inclusive, the R's being the same or different in any given molecule;

IV. $Ti(OCOR_1)_{4-n}(OR_1)_n$ where $n$ is 0 to 3, inclusive, $R_1$ is one of alkyl (linear or branched), cycloalkyl (including branched), and aryl (including branched), preferably alkyl (linear or branched), having from 1 to 22, preferably from 1 to 18, carbon atoms per molecule, inclusive, the $R_1$'s being the same or different in any given molecule; and a chelate of the formula

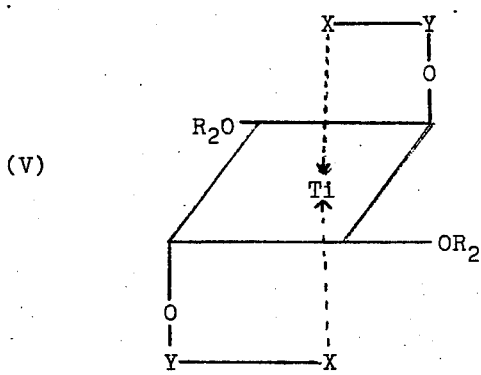

(V)

where X is one of oxygen, nitrogen, phosphorus, sulfur, —PH, —PH$_3$, —SH, —OH, —NH, —N(R''OH)$_z$, preferably —OH, —N(CH$_2$—CH$_2$—OH)$_2$, and oxygen, R'' is alkyl having from 1 to 10 carbon atoms, inclusive, and z is 1 or 2; Y is one of

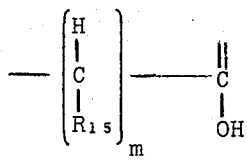

R$_{15}$ is hydrogen or alkyl, linear or branched, having from 1 to 8 carbon atoms, inclusive, and m is 1 or 2,

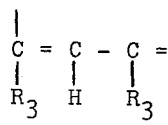

R$_3$ is alkyl, linear or branched, having from 1 to 8 carbon atoms, inclusive,

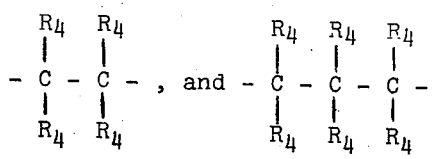

R$_4$ is one of hydrogen and alkyl, linear or branched, having from 1 to 4 carbon atoms, inclusive; and R$_2$ is one of hydrogen, alkyl (linear or branched) having from 1 to 10 carbon atoms, inclusive, and R$_5$OH where R$_5$ is alkylene (linear or branched) having from 1 to 10 carbon atoms, inclusive.

It is presently preferred in the foregoing chelate structure that when X is oxygen, Y is

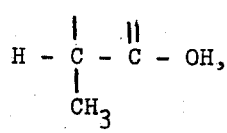

R$_2$ is hydrogen; when X is oxygen, Y is

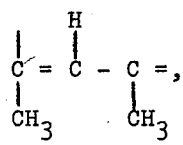

and R$_2$ is C$_3$H$_7$; when X is —N(CH$_2$— CH$_2$ — OH)$_2$, Y is —CH$_2$— CH$_2$ —, and R$_2$ is C$_3$H$_7$; and when X is —OH, Y is

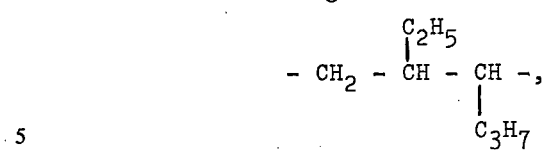

and R$_2$ is

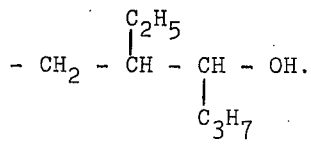

Suitable specific titanates include tetraisopropyl titanate, tetrabutyl (including n-butyl, isobutyl, sec-butyl, tert-butyl), titanate, tetrakis(2-ethylhexyl)titanate, tetrastearyl titanate, polyhydroxy stearate, tetraoctylene glycol titanate, triethanolamine, titanate, titanium acetyl aceonate, titanium lactate, alkali metal salts of titanium lactate, and ammonium salts of titanium lactate.

The additives of this invention are prepared by mixing one or more emulsifiers and one or more titanates together to provide a substantially homogeneous mixture thereof. The mixing can be carried out at subambient or ambient temperatures or elevated temperatures up to about 350°F. Similarly, subambient, ambient, or superambient pressures can be employed as desired. The mixing can be carried out under ambient atmosphere or an inert atmosphere as desired. The mixing will generally be at least about 0.5 minutes and normally a suitably homogeneous mixture can be achieved with mixing from about 3 minutes to about 2 hours.

The additive of this invention will generally contain the emulsifier and titanate in a weight ratio of an emulsifier: titanate of at least 0.05:1, preferably from about 0.05:1 to about 1:0.05.

The additive can then be mixed with the drilling fluid using mixing conditions substantially the same as those set forth hereinabove for the preparation of the additive.

It should be noted that the emulsifier and titanate components of the additive can be added to the drilling fluid combined as a single additive as described above or separately thereby forming the additive in situ in the drilling fluid. When adding the emulsifier and titanate to the drilling fluid separately, they can be added to the drilling fluid at the same time or in any sequence, e.g., emulsifier first and then titanate or vice versa. When the emulsifier and titanate are added to the drilling fluid separately the conditions of mixing are substantially the same conditions as those set forth hereinabove for the preparation of the additive.

Generally, the additive of this invention or the separate components thereof are added to the drilling fluid in amounts which provide sufficient additive in the drilling fluid to substantially stabilize the fluid against salt contamination. This amount of additive can vary widely but will generally be at least about 0.25 pounds of additive (separately formed or formed in situ) per barrel of drilling fluid. There is no real limit on the amount of additive employed other than economic factors which are unrelated to the function of the additive in the drilling fluid.

Thus, the improved organic base drilling fluid of this invention is that which contains an effective inorganic salt stabilizing amount of at least one additive of this invention.

Further, the improved method of this invention comprises in its improved feature, the mixing of at least one of the additives of this invention with the drilling fluid in an effective stabilizing amount.

EXAMPLE

An organic base drilling fluid was prepared by mixing 161 milliliters of Diesel oil; 70 milliliters of a 25 weight per cent aqueous solution of calcium chloride; the equivalent of 24 pounds per barrel (U.S.) of a mixture composed of 36.8 weight per cent of a magnesium soap of a mixture of oleic and stearic acids, 29.5 weight per cent asphalt, 3.1 weight per cent nonionic emulsifier composed of an etheylene oxide adduct of a mixture of linear carbon atom chains having from 12 to 14 carbon atoms per chain, 10.5 weight per cent rosin, 8.4 weight per cent manganese dioxide, and 11.6 weight per cent calcium hydroxide; and finally the equivalent of 470 pounds per barrel (U. S.) of barite. The drilling fluid was prepared by adding to the Diesel oil with stirring at room temperature and pressure the 24 pound per barrel mixture, followed by the aqueous calcium chloride solution, and finally the barite.

The drilling fluid was then split into 1 barrel (U. S.) equivalent samples and tested in various runs as set forth hereinbelow.

In each run, after the Carnallite, emulsifier and/or titanate, or other components had been added to the drilling fluid sample, the mixture was placed in a cylindrical container which was then aged by rolling the container for 118 hours at a temperature of 300°F. This aging test subjected the drilling fluid to very stringent conditions because the Carnallite will not flip the drilling fluid immediately. The Carnallite will dissolve in the drilling fluid when the temperature of the drilling fluid is elevated and when the temperature of the drilling fluid is reduced the Carnallite will precipitate out carrying water with it and water wetting the barite. This causes the barite to settle out of the drilling fluid and the barite settling in turn can flip the fluid to the undesired oil-in-water emulsion.

Thus, the observation of each run sample for barite settling after heating at 300°F. gave a very good indication of whether the drilling fluid was stabilized against Carnallite contamination. If the drilling fluid was stabilized there would be no settling of barite solids to the bottom of the container after the aging step. However, if the drilling fluid was not stabilized against Carnallite contamination, there would be a measurable thickness of barite that settled out of the drilling fluid and collected as a muddy layer on the bottom of the sample container.

In runs 1–6 the drilling fluid was tested by (1) itself, (2) with the addition of the equivalent of 40 pounds per barrel of Carnallite, (3) with the addition of the equivalent of 1 pound per barrel of calcium dodecylbenzene sulfonate and 40 pounds per barrel Carnallite, (4) with the addition of the equivalent of 1 pound per barrel of calcium dodecylbenzene sulfonate, 1 pound per barrel tetraoctylene glycol titanate, and 40 pounds per barrel Carnallite, (5) with the addition of the equivalent of 4 pounds per barrel of calcium dodecylbenzene sulfonate, and (6) with addition of the equivalent of 4 pounds per barrel calcium dodecylbenzene sulfonate and 1 pound per barrel tetraoctylene glycol titanate, respectively. The results of these runs are set forth hereinafter in Table I.

TABLE I

| Run | Additives to Drilling Fluid | Settling after Aging |
|---|---|---|
| 1 | None | None |
| 2 | 40 lbs. Carnallite | Extreme, emulsion flipped to oil-in-water |
| 3 | 1 lb. Ca dodecylbenzene sulfonate (1) 40 lbs. Carnallite | Substantial, ½ inch thick deposit |
| 4 | 1 lb. Ca dodecylbenzene sulfonate 1 lb. Tetraoctylene Glycol Titanate 40 lbs. Carnallite | None |
| 5 | 4 lbs. Ca dodecylbenzene sulfonate | Substantial, 1½ inch thick deposit |
| 6 | 4 lbs. Ca dodecylbenzene sulfonate 1 lb. Tetraoctylene Glycol Titanate | None |

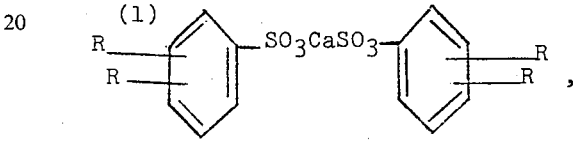

where R is a dodecyl radical.

Run 5 shows that large amounts of emulsifier by itself does not prevent settling. Run 6 shows that by adding a small amount of titanate to run 5 the settling problem was eliminated.

Runs 7–10 were conducted in the same manner as runs 1–6 except that in runs 7–9 the equivalent of 5 pounds per barrel of drilling fluid of a commercially available calcium dodecylbenzene sulfonate was employed and except that in run 10 the equivalent of 1 pound per barrel of an organophillic clay was employed instead of the titanate of this invention. The results of these runs are set forth in Table II.

TABLE II

| Run | Additives to Drilling Fluid | Settling after Aging |
|---|---|---|
| 7 | 5 lbs. Ca dodecylbenzene sulfonate(2) | Substantial, ½ inch thick deposit |
| 8 | 5 lbs. Ca dodecylbenzene sulfonate(2) 40 lbs. Carnallite | Substantial, ½ inch thick deposit |
| 9 | 5 lbs. Ca dodecylbenzene sulfonate(2) 1 lb. Tetraoctylene Glycol Titanate | None |
| 10 | 1 lb. Ca dodecylbenzene sulfonate(1) 40 lbs. Carnallite 1 lb. Montmorillonite with the Na cations replaced with quaternary ammonium cations to make hydrocarbonphillic instead of waterphillic(3) | Substantial, 1 inch thick deposit |

(1)See Table I, footnote (1)
(2)Commercially available under the name SA–47
(3)Commercially available under the name BENTONE 34

From Table II, it can be seen that substantial deposition of barite was realized in run 7 where the emulsifier was employed by itself. This indicates undue thinning of the drilling fluid. Undue thinning is also indicated in run 8 where the emulsifier was employed with Carnallite. However, run 9 shows that when the same emulsifier from runs 7 and 8 was employed in combination with a titanate of this invention no settling occurred.

Run 10 shows that the use of materials other than the titanate of this invention in combination with the emulsifier of this invention did not prevent settling.

Runs 11–13 were carried out in the same manner as runs 1-6 except that various other titanates in accordance with this invention were combined with an emulsifier in accordance with this invention to combat Carnallite contamination. In these runs the equivalent of 1 pound per barrel of the various titanates was employed in addition to the equivalent of 1 pound per barrel of calcium dodecylbenzene sulfonate and 40 pounds per barrel of Carnallite. The results of these runs are set forth in Table III.

Table III

| Run | Additives to Drilling Fluid | Settling after Aging |
|-----|------------------------------|----------------------|
| 11 | 1 lb. Ca dodecylbenzene sulfonate (1)<br>40 lbs. Carnallite<br>1 lb. Tetrakis (2-ethylhexyl) Titanate | None |
| 12 | 1 lb. Ca dodecylbenzene sulfonate (1)<br>40 lbs. Carnallite<br>1 lb. Triethanolamine Titanate | None |
| 13 | 1 lb. Ca dodecylbenzene sulfonate (1)<br>40 lbs. Carnallite<br>1 lb. Polyhydroxy Stearate Titanate (2) | None |

(1) See Table I, footnote (1)
(2) The material used had the approximate formula

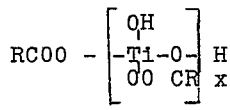

where R is $C_{17}H_{35}$ and X is 18–19. This is believed to be the only commercially available polyhydroxy stearate titanate compound. It has a molecular weight of about 1971. It is sold under the trademark TLF 2005 by E. I. duPont de Nemeurs and Company. These compounds and their manufacture are described in U.S. Pat. No. 2,621,194, which is incorporated herein by reference. It describes polhydroxy stearate titanate compounds of various molecular weights. Attention is directed to Examples 1 and 3 and column 7 thereof.

Runs 14 and 15 were carried out in the same manner as runs 1–6 except that the equivalent of 2 pounds per barrel of drilling fluid of a sulfosuccinate compound was employed by itself in run 14 and in combination with a titanate in run 15 to combat Carnallite contamination. The equivalent of 2 pounds per barrel of drilling fluid of the sulfosuccinate was employed in combination with the equivalent of 40 pounds per barrel of drilling fluid of Carnallite for run 14 and, additionally, the equivalent of 1 pound per barrel of drilling fluid of tetraoctylene glycol titanate in run 15. The results of these runs are set forth in Table IV.

TABLE IV

| Run | Additives to Drilling Fluid | Settling after Aging |
|-----|------------------------------|----------------------|
| 14 | 2 lbs. lauryl lauric alkyloamide(1) sodium sulfosuccinate<br>40 lbs. Carnallite | Substantial, ½ inch thick deposit |
| 15 | 2 lbs. lauryl lauric alkyloamide(1) sulfosuccinate<br>40 lbs. Carnallite<br>1 lb. Tetraoctylene Glycol Titanate | None |

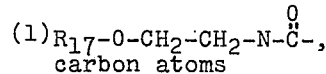

where $R_{17}$ is an alkyl having from 2 to 12 carbon atoms

Run 15 shows that the combination of the sulfosuccinate compound and the titanate eliminated the settling problem shown to be present in run 14 where only the sulfosuccinate compound was used.

Reasonable variations and modifications are possible within the scope of this disclosure without departing from the spirit and scope of this invention.

The embodiments of the invention in which an exclusive property or privilege is claimed are defined as follows:

1. An oil base drilling fluid additive consisting essentially of
   1. at least one anionic emulsifier which is at least partially soluble in said oil base, and
   2. at least one titanate selected from the group consisting of
      A. Ti(OR)$_4$
         where R is one of alkyl, cycloalkyl, and aryl, each having from 1 to 22 carbon atoms per molecule, inclusive, the R's being the same or different in any given molecule;
      B. Ti(OCOR$_1$)$_{4-n}$(OR$_1$)$_n$
         where $n$ is 0 to 3, inclusive, R$_1$ is one of alkyl, cycloalkyl, and aryl, each having from 1 to 22 carbon atoms per molecule, inclusive, the R$_1$'s being the same or different in any given molecule; and
      C. a chelate of the formula

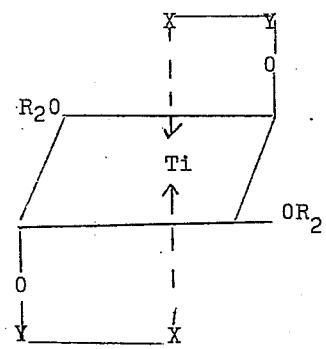

where X is one of oxygen, —OH and —N(R″OH)$_z$, R″ is alkyl having from 1 to 10 carbon atoms, inclusive, and z is 1 or 2; Y is one of

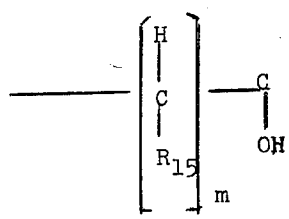

4. The additive according to claim 2 wherein said emulsifier is at least one of

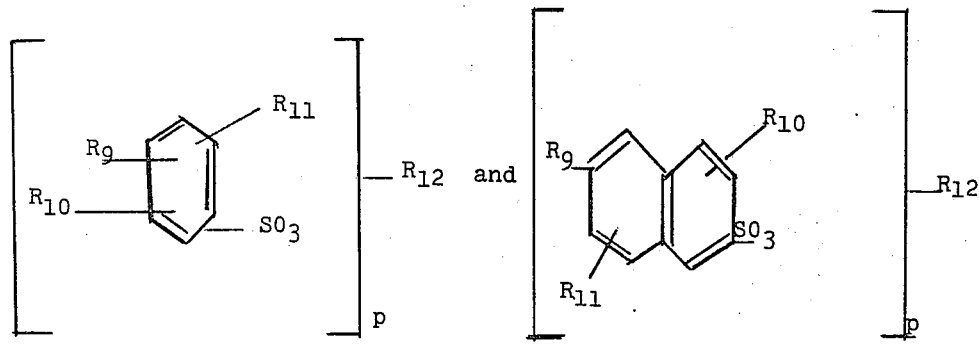

$R_{15}$ being hydrogen or alkyl having from 1 to 10 carbon atoms, inclusive, and $m$ is 1 or 2,

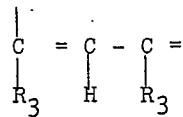

$R_3$ being alkyl having from 1 to 8 carbon atoms, inclusive,

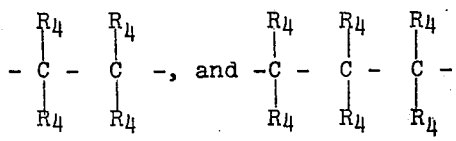

$R_4$ being hydrogen or alkyl having from 1 to 4 carbon atoms, inclusive; and $R_2$ is one of hydrogen alkyl having from 1 to 10 carbon atoms, inclusive, and $R_5OH$ where $R_5$ is alkylene having from 1 to 10 carbon atoms, inclusive, and D. polyhydroxy stearate titanate the emulsifier (1) and titanate (2) being present in a weight ratio 1)/2) of at least about 0.05/1.

2. The additive according to claim 1 wherein said emulsifier is at least one oil soluble alkylaryl sulfonic acid, alkylaryl sulfonate, sulfosuccinate compound of the formula

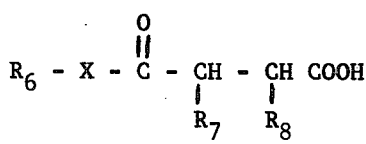

where $R_6$ is a fatty acid residue or fatty alcohol residue, X is an alkylene grouping joined to $R_6$ and to the sulfosuccinic residue via amide or ester linkages, one of $R_7$ and $R_8$ is hydrogen and the other is —$SO_3M$ where M is one of alkali metal and alkaline earth metal, and mixtures thereof, and said titanate is at least one corresponding to formula C.

3. The additive according to claim 2 wherein said weight ratio of 1)/2) is from about 0.05/1 to about 1/0.05.

where $p$ is an integer from 1 to 6, inclusive, $R_9$ and $R_{10}$ are the same or different alkyl radicals having from 10 to 30, inclusive, carbon atoms, $R_{12}$ is one of hydrogen, alkali metal, alkaline earth metal, Al, Pb, Cr, Mn, Fe, Co, Ni, —$NH_4$, primary amine H, secondary amine H, and tertiary amine H, and $R_{11}$ is one of halogen, —OH, —$NH_2$, and hydrogen.

5. The additives according to claim 4 where P is 2, $R_9$ and $R_{10}$ are each dodecyl radicals, $R_{12}$ is one of an alkali metal and an alkaline earth metal and $R_{11}$ is hydrogen, and said titanate corresponds to formula C where $R_2$ is

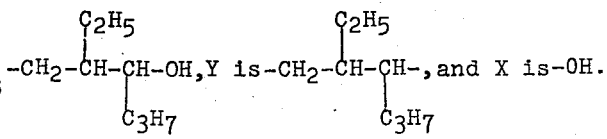

6. The additive according to claim 2 wherein said emulsifier is at least one sulfosuccinate compound as defined in claim 2 and said titanate corresponds to formula C where $R_2$ is

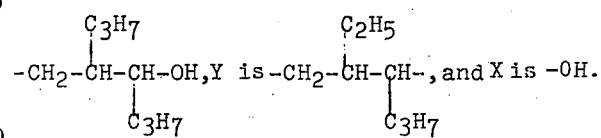

7. The additive according to claim 6 wherein said succinate compound is lauryl lauric alkylolamide sodium sulfosuccinate wherein the alkyl has from 2 to 12, inclusive, carbon atoms.

8. The additive according to claim 1 wherein the emulsifier is one of calcium dodecylbenzene sulfonate and lauryl lauric alkylolamide sodium sulfosuccinate, and the titanate is one of tetraoctylene glycol titanate, tetrakis (2-ethylhexyl) titanate, and triethanolamine titanate.

* * * * *